G. B. SNOW & T. G. LEWIS.
DENTAL PLUGGER.
No. 7,274. Reissued Aug. 22, 1876.
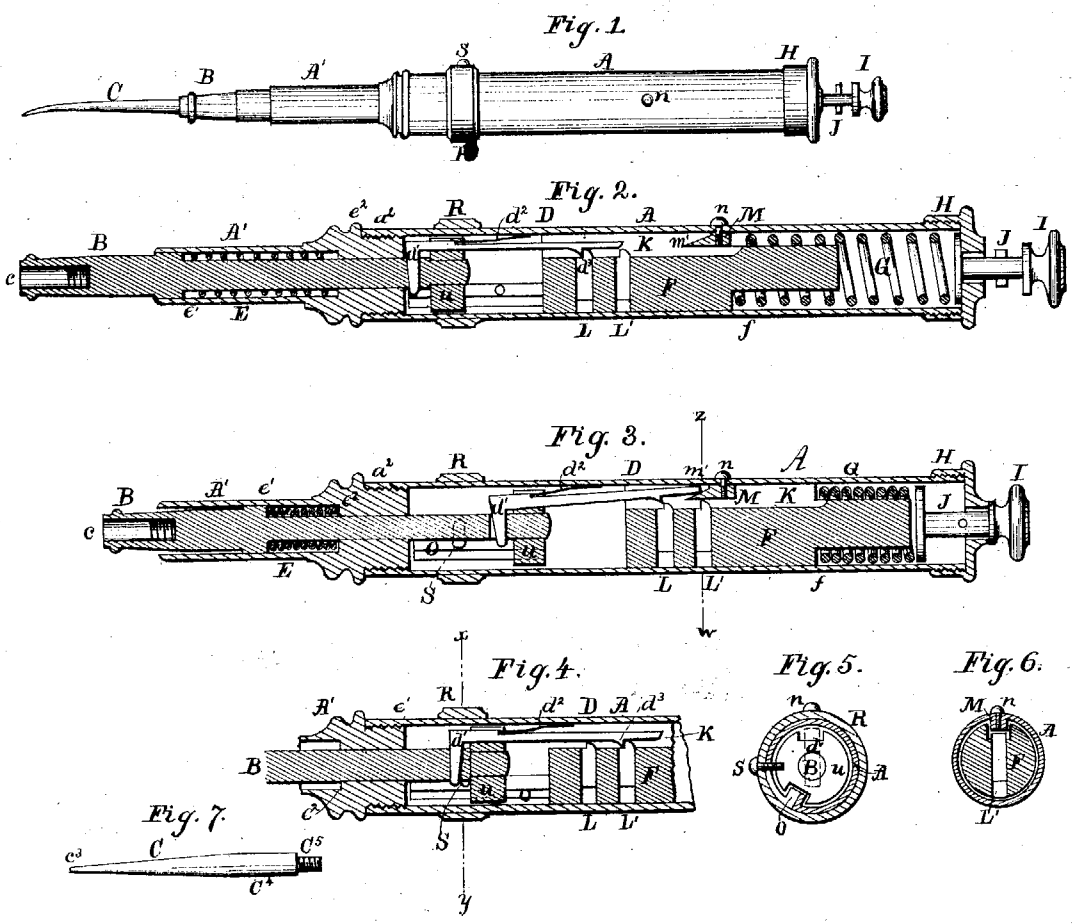
Witnesses:
W. H. Foster.
William Sam.
Inventor:
Geo. B. Snow.
Thos. G. Lewis

UNITED STATES PATENT OFFICE.

GEORGE B. SNOW AND THEODORE G. LEWIS, OF BUFFALO, NEW YORK, ASSIGNORS, BY MESNE ASSIGNMENTS, TO THEMSELVES, JOHN E. ROBIE, AND JAMES Q. BRADT, COMPOSING THE FIRM OF THE BUFFALO DENTAL MANUFACTURING COMPANY.

IMPROVEMENT IN DENTAL PLUGGERS.

Specification forming part of Letters Patent No. 59,284, dated October 30, 1866; reissue No. 7,274, dated August 22, 1876; application filed April 28, 1876.

*To all whom it may concern:*

Be it known that we, GEORGE B. SNOW and THEODORE G. LEWIS, of Buffalo, Erie county, and State of New York, have invented a new and useful Dental Plugging-Instrument; and we do hereby declare that the following is a full and exact description thereof, reference being had to the accompanying drawing, making a part of this specification, in which—

Figure 1 is an elevation of the instrument, full size. Fig. 2 is a longitudinal section, on an enlarged scale, showing the different parts of the instrument in the positions they assume when adjusted to give the greatest fall to the hammer. It also shows the interior of our improved socket for holding the plugging tool or point. Fig. 3 is a longitudinal section, on the same scale as Fig. 2, showing the spring-catch as about to release the hammer, the inner end of the tool-holder being sufficiently beyond the feather O to receive the blow when the hammer falls. It also shows the piston I compressing the spring G, for the purpose of increasing the tension thereof, and so adding to the force of the blow. Fig. 4 is a partial longitudinal section, showing the collar *u* of the tool-holder resting against the screw S, and the lifting-bar engaged with the stop L′ in the hammer, the parts being thus adjusted for a less travel and a lighter blow. Fig. 5 is a transverse section on the dotted line *xy*, showing the same positions of the parts as Fig. 4. Fig. 6 is a transverse section on the dotted line *zw*. Fig. 7 is an elevation, on an enlarged scale, of a plugging tool or point, showing our improved socket-fastening.

This invention relates to the construction of a dental plugging-instrument, by which blows are produced to impact the filling in the tooth, in such a manner that it shall be operated by simply pressing the point against the filling, and in such a manner as to dispense with any external working parts necessary to its operation. We thus render the instrument more convenient in manipulation, as it can be held in almost any position in the hand and successfully operated, the blow being given automatically as the point is pressed against a resisting object.

Our improvements in the construction of the instrument consist, first, in providing a stop, upon which the hammer rests independently of support from either the spring-catch or tool-holder; second, in providing a spring by which, in connection with the stop hereinbefore mentioned, the hammer is raised from the tool-holder after a blow has been given and as the instrument is withdrawn from the filling; third, in making the spring-catch form a direct connection between the tool-holder and the hammer; fourth, in forming the inclined plane by which the spring-catch is cast off with a shoulder, against which the lifting-bar abuts, thus arresting the inward motion of the tool-holder as the blow is delivered upon it; fifth, in placing a spiral spring in the case to actuate the hammer, and in such connection with a piston and screw-cap that its tension may be varied, and light or heavy blows may be obtained, as may be required; sixth, in providing a mechanism for limiting and varying the travel of the tool-holder, so that the distance through which the hammer falls may be varied, and the force of the blow increased or diminished; seventh, in a new and improved mode of securing the plugging tool or point in the socket, by which it is both more securely retained and more readily released than by the devices heretofore used.

The operating parts are contained in a tubular case, which is formed in two sections, A and A′. The section A is of equal diameter throughout, threaded externally at one end to receive the screw-cap H, and threaded internally at the other end to receive the section A′. The feather O is fastened inside of the section A, near the end which receives the section A′. The inclined plane M is also fastened at a suitable point in its interior. The section A′ is tubular, of smaller diameter than the section A, and is connected therewith by an enlarged threaded end, as shown at $a^2$. Its bore is contracted at the inner end, as shown at $e^2$, to form a bearing for the tool-holder, and an abutment for the tool-holder spring E. The tool-holder B passes entirely through the section A′, and is provided with a socket, *c*, at its outer end, to receive the plugging-tool C. This socket is smooth at the part next its mouth, and threaded near the bottom, and, the socket end of the plugging-tool being a counterpart, it may be screwed in, and securely fastened. The tool-holder has longitudinal motion in A′, and has two bearings therein at $e^1$ and $e^2$. A spiral spring, E, surrounds the middle of the tool-holder, and bears against a shoulder formed upon it at $e^1$, and against a shoulder in A′ at $e^2$, and acts upon the tool-holder to thrust it outwardly from the case. Near the inner end of the tool-holder is a transverse hole, for the reception of the bent end or hook of the lifting-bar, as shown at $d^1$. At the extreme inner end of the tool-holder is securely fastened the collar *u*. The hammer F is placed entirely within the section A of the case. It has securely fastened in it the stops L L′, which project into the groove K, which is cut longitudinally along one side of the hammer. A spiral spring, G, bears against the shoulder *f′* on the hammer. Its other end bears against the piston I, which passes into the case through the screw-cap H.

The piston I may be thrown outwardly, as shown in Fig. 2, or pushed inwardly, to increase the tension of the spring G, and so increase the force of the blow, as shown in Fig. 3. When it is pushed in the pin J, which passes transversely through its stem, may be caught under the screw-cap H, by giving the piston I a slight rotary movement, thus retaining the piston in its position.

The inclined plane M is fastened to the inside of the case by the screw *n*, and is contained in the groove K in the hammer, which is wide enough to allow the hammer free motion, and deep enough to permit the passage of the catches L L′ under the inclined plane M. There is a shoulder, *m′*, formed on the inclined plane at the part nearest the case A, by which an abutment is provided, and the inward motion of the lifting-bar D and the tool-holder B arrested at the moment the hammer is liberated.

The lifting-bar D has at one end a bent portion, which is received in a hole in the tool-holder, as shown at $d^1$. It has on its side a flat spring, bearing against the inside of the case A, as shown at $d^2$, and near its end a shoulder, $d^3$, which engages with the stops L L′, respectively, as the adjustment of the instrument may allow, thus constituting a form of the device known to mechanics as a spring-catch. The extreme end of the lifting-bar is slightly rounded or beveled, and engages with the inclined plane M, and it is thus disengaged or lifted from the stops L L′, and the hammer liberated for its descent upon the tool-holder.

The collar *u* has two longitudinal grooves in its periphery, one of which is occupied by the lifting-bar D, and the other by the feather O, which serves as a guide to the tool-holder, preventing its rotation. A lateral slot is cut through the case A, extending into one side of and nearly through the feather O. A ring or sleeve, R, is slipped over the case A, and a screw, S′, fastened therein, passes through the slot into the interior of the case. When the ring R is turned in one direction the screw S is received into the notch formed in the feather O by the slot, and the collar *u* meets with no obstruction, but passes freely over it. Now, if the tool-holder is pushed into the case and the ring R turned before it is released, so as to bring the screw S to the opposite end of the slot, the collar *u* will strike the screw S as the tool-holder recoils, as shown in Fig. 5. The shoulder $d^3$ of the lifting-bar then engages with the stop L′ of the hammer, as shown in Fig. 4. The travel of the parts being thus lessened, the hammer falls a less distance and produces a lighter blow. The inward motion of the tool-holder is arrested by the abutment of the end of the lifting-bar against the shoulder *m′* on the inclined plane M. At this time the inner end of the tool-holder has just passed the feather O, and is struck by the hammer as it descends. When the tool-holder moves outwardly, the hammer is prevented from following it by, and rests upon, the end of the feather O. The feather thus forms a stop for the support of the hammer in addition to its functions as a guide for the tool-holder and a receptacle for the screw S.

By the arrangement of parts we describe, we are enabled to produce an instrument in which all the working parts are included in a case of a suitable size and shape to serve as a handle, and by the use of the stop or abutment on which the hammer rests and the spring actuating the tool-holder, by the recoil of which the raising of the hammer is accomplished, the employment of levers and like devices, heretofore used in similarly-operating instruments, is dispensed with. These changes in the construction of the instrument make a material difference in its operation. Instead of the hammer being both raised and disengaged by pushing the tool against a resisting object, it, being already raised, is simply retained by the spring-catch at a distance from the tool-holder until the proper time comes for its disengagement, and it is raised as the tool is removed from the resisting object, after the blow has been delivered. The force necessary for raising the hammer is merely sufficient to overcome the friction of the working parts, and is a constant quantity, not affected by variations in the tension of the spring G, which actuates the hammer. It can, therefore, be accurately provided for by adjustment of the tension of the spring E.

Instruments constructed in the manner herein described will, therefore, be found to operate by less expenditure of force, especially when the spring G is under heavy tension, than those of earlier design, in which the longitudinal movement of the tool-holder is used as a means of operating the working parts through the interposition of lever-connections.

The operator holds the instrument in his hand and presses the point of the plugging-tool against the filling material in the tooth. A moderate pressure causes the case to pass over the tool-holder. The lifting-bar, being engaged with either the stop L or L′, retains the hammer at a certain distance from the tool-holder, and the pressure being continued, the case passes over these parts, compressing as it moves the springs E and G. The inclined plane, being fastened in the case, is finally brought in contact with the end of the lifting-bar, which it lifts from the catch L or L′, thus liberating the hammer, which descends upon the tool-holder, giving it a blow which serves to impact the filling in the tooth with a degree of force varying with the adjustment of the instrument, as heretofore described. The pressure upon the instrument being now relaxed, the recoil of the spring E will throw back the case from the tool-holder, the feather O will raise the hammer from the tool-holder, the lifting-bar will again engage with its catch on the hammer, and the parts are again in position to give a blow, whenever pressure is applied; and thus the blows may be repeated as often as may be required.

The dentist requires a number of tools or points in filling teeth, which vary in shape to reach different parts of the cavity in the tooth and different positions in the mouth, and it is necessary to provide a means of retaining these tools securely in the socket C, and at the same time to provide for their ready removal. We do this by adding to the plain socket generally used for this purpose a threaded portion at the bottom; and we thus secure the steadiness incident to the employment of a long bearing without consuming the time which would be necessarily used if the whole socket were threaded in changing the points. If the plain socket is used, the succession of blows it receives will often so tighten the point in it that it will be found difficult of removal, it being necessary to make the fit a slight taper for security of fastening.

With our improved socket the point may be grasped in any suitable manner and readily removed, the blows having no effect to tighten the screw-fastening, which may always be loosened by about the same amount of force used when the point was inserted.

Another advantage in this fastening is that it is easy to secure uniformity in the sizes of the points and sockets when they are made after this plan, an item of great importance when large quantities of them are to be made interchangeable.

Having thus fully described our improved dental plugging-instrument, what we claim as new therein, and desire to secure by Letters Patent, is—

1. A stop or abutment attached to the case of a dental plugging-instrument, for the purpose of arresting the motion of the hammer in the case at the point where it strikes the tool-holder, and there supporting it against the action of its impelling-spring, independently of either the tool-holder or spring-catch, substantially as described.

2. A spring interposed between a reciprocating tool-holder and its encircling case, operating to thrust the tool-holder outwardly from the case, substantially as herein described.

3. The combination of a stop attached to the case of a dental plugging instrument, and a spring interposed between said case and a reciprocating tool-holder therein contained, when operating to raise or separate a reciprocating mallet from the tool-holder, independently of the action of a spring-catch, substantially as herein described.

4. The combination, with the case of a dental plugging-instrument, of a hammer reciprocating therein, a spring actuating the hammer, a tool-holder reciprocating in the case, and a spring interposed between the case and the tool-holder, for constantly thrusting outwardly the latter, substantially as described.

5. A tubular case constructed in two sections, one containing a mallet, its actuating spring, and spring-catch, the other a reciprocating tool-holder by which the mallet is operated, and a spring to raise the mallet from the tool-holder, substantially as herein described.

6. The lifting-bar D, connected at one end with the tool-holder, and having radial motion thereon, and engaging at its other end with the hammer F and inclined plane M, substantially as herein described.

7. The combination, substantially as herein described, of the tool-holder B, lifting-bar D, and inclined plane M, having on it a shoulder, $m'$, serving as an abutment for the lifting-bar D, and thereby arresting the motion of the case A over the tool-holder B.

8. The combination, substantially as herein described, of the spiral spring G, actuating the mallet F, with an adjustable piston, I, and screw-cap H, for the purposes hereinbefore set forth.

9. The combination, in a dental plugging-instrument, substantially as herein described, of a tubular case, a ring or sleeve surrounding the case and movable thereupon, a stop or screw fastened in the sleeve, and projecting through a slot in the case into its interior, and a reciprocating mechanism contained within the case, operating to produce blows, the whole being so constructed and arranged that the motion of the reciprocating mechanism within the case may be arrested or modified by the motion of the said sleeve.

10. The combination, with the ordinary socket plugging-tool, of a terminal screw, $c^5$, for the purpose of retaining the said tool more securely in its socket, for use substantially as hereinbefore set forth.

GEO. B. SNOW.
THEO. G. LEWIS.

Witnesses:
W. H. FOSTER,
WILLIAM GRAM